(12) United States Patent
Platt et al.

(10) Patent No.: US 8,615,490 B1
(45) Date of Patent: Dec. 24, 2013

(54) METHOD AND SYSTEM FOR RESTORING INFORMATION FROM BACKUP STORAGE MEDIA

(75) Inventors: Mark Jonathan Platt, Cedar Park, TX (US); Christopher Kent Pratt, Round Rock, TX (US); Keith Roger Burns, Austin, TX (US); Erik James Omberg, Maple Grove, MN (US)

(73) Assignee: Renew Data Corp., Austin, TX (US)

( * ) Notice: Subject to any disclaimer, the term of this patent is extended or adjusted under 35 U.S.C. 154(b) by 290 days.

(21) Appl. No.: 12/023,837

(22) Filed: Jan. 31, 2008

(51) Int. Cl.
*G06F 7/00* (2006.01)
*G06F 17/00* (2006.01)

(52) U.S. Cl.
USPC .......................................... 707/640; 707/674

(58) Field of Classification Search
USPC .................. 707/674–680, 640–641
See application file for complete search history.

(56) References Cited

U.S. PATENT DOCUMENTS

| | | | |
|---|---|---|---|
| 4,706,212 A | 11/1987 | Toma | |
| 5,107,419 A | 4/1992 | MacPhail | |
| 5,278,980 A | 1/1994 | Pedersen et al. | |
| 5,350,303 A | 9/1994 | Fox et al. | |
| 5,535,121 A | 7/1996 | Roche et al. | |
| 5,535,381 A * | 7/1996 | Kopper | 710/52 |
| 5,617,566 A | 4/1997 | Malcolm | |
| 5,644,774 A | 7/1997 | Fukumochi et al. | |
| 5,687,384 A | 11/1997 | Nagase | |
| 5,689,699 A | 11/1997 | Howell et al. | |
| 5,717,913 A | 2/1998 | Driscoll | |
| 5,732,265 A | 3/1998 | Dewitt et al. | |
| 5,742,807 A | 4/1998 | Masinter | |
| 5,778,395 A | 7/1998 | Whiting et al. | |
| 5,813,009 A | 9/1998 | Johnson et al. | |
| 5,813,015 A | 9/1998 | Pascoe | |
| 5,926,811 A | 7/1999 | Miller et al. | |
| 5,937,401 A | 8/1999 | Hillegas | |
| 5,982,370 A | 11/1999 | Kamper | |
| 6,006,221 A | 12/1999 | Liddy et al. | |
| 6,023,710 A | 2/2000 | Steiner et al. | |
| 6,047,294 A | 4/2000 | Deshayes et al. | |
| 6,125,371 A | 9/2000 | Bohannon et al. | |

(Continued)

FOREIGN PATENT DOCUMENTS

EP 1967972 A1 9/2008
JP 2003303194 A 10/2003

(Continued)

OTHER PUBLICATIONS

Amati, G. et al.; "Probabilistic Models of Information Retreival Based on Measuring the Divergence from Randomness"; ACM Transactions on Information Systems, vol. 20, No. 4. Oct. 2002.

(Continued)

*Primary Examiner* — Robert Beausoliel, Jr.
*Assistant Examiner* — Susan F Rayyan
(74) *Attorney, Agent, or Firm* — Berry & Associates P.C.

(57) ABSTRACT

First and second partial files are read from first and second storage media, respectively, irrespective of a sequence in which the first and second storage media were originally written relative to one another. The first partial file forms a first portion of a complete file. The second partial file forms a second portion of the complete file. The first and second partial files are combined to extract and form the complete file, without dependence on re-reading the first and second storage media.

12 Claims, 4 Drawing Sheets

(56) References Cited

U.S. PATENT DOCUMENTS

| | | | |
|---|---|---|---|
| 6,157,931 A | 12/2000 | Cane et al. | |
| 6,182,029 B1 | 1/2001 | Friedman | |
| 6,189,002 B1 | 2/2001 | Roitblat | |
| 6,199,067 B1 | 3/2001 | Geller | |
| 6,199,081 B1 | 3/2001 | Meyerzon et al. | |
| 6,216,123 B1 | 4/2001 | Robertson et al. | |
| 6,226,630 B1 | 5/2001 | Billmers | |
| 6,226,759 B1 | 5/2001 | Miller et al. | |
| 6,240,409 B1 | 5/2001 | Aiken | |
| 6,243,713 B1 | 6/2001 | Nelson et al. | 1/1 |
| 6,256,633 B1 | 7/2001 | Dharap | |
| 6,269,382 B1 | 7/2001 | Cabrera et al. | |
| 6,278,992 B1 | 8/2001 | Curtis et al. | |
| 6,324,548 B1 | 11/2001 | Sorenson | |
| 6,389,403 B1 | 5/2002 | Dorak | |
| 6,393,389 B1 | 5/2002 | Chanod et al. | |
| 6,408,266 B1 | 6/2002 | Oon | |
| 6,421,767 B1 | 7/2002 | Milillo et al. | |
| 6,453,280 B1 | 9/2002 | Yang | |
| 6,477,544 B1 | 11/2002 | Bolosky et al. | |
| 6,493,711 B1 | 12/2002 | Jeffrey | |
| 6,662,198 B2 | 12/2003 | Satyanarayanan et al. | 1/1 |
| 6,708,165 B2 | 3/2004 | Jeffrey | |
| 6,745,197 B2 | 6/2004 | McDonald | |
| 6,751,628 B2 | 6/2004 | Coady | |
| 6,778,979 B2 | 8/2004 | Grefenstette et al. | |
| 6,810,395 B1 | 10/2004 | Bharat | |
| 6,834,110 B1 | 12/2004 | Marconcini et al. | |
| 6,859,800 B1 | 2/2005 | Roche et al. | |
| 6,915,435 B1 | 7/2005 | Merriam | |
| 6,928,526 B1 | 8/2005 | Zhu et al. | |
| 6,947,954 B2 | 9/2005 | Cohen et al. | |
| 6,952,737 B1 | 10/2005 | Coates et al. | |
| 6,954,750 B2 | 10/2005 | Bradford | 1/1 |
| 6,996,580 B2 | 2/2006 | Bae et al. | |
| 7,047,386 B1 | 5/2006 | Ngai et al. | |
| 7,089,286 B1 | 8/2006 | Malik | |
| 7,137,065 B1 | 11/2006 | Huang et al. | |
| 7,146,388 B2 | 12/2006 | Stakutis et al. | |
| 7,158,970 B2 | 1/2007 | Chang et al. | |
| 7,174,368 B2 | 2/2007 | Ross, Jr. | 709/207 |
| 7,260,568 B2 | 8/2007 | Zhang et al. | |
| 7,269,564 B1 | 9/2007 | Milsted et al. | |
| 7,284,191 B2 | 10/2007 | Grefenstette et al. | |
| 7,287,025 B2 | 10/2007 | Wen et al. | |
| 7,313,556 B2 | 12/2007 | Gallivan et al. | |
| 7,325,041 B2 * | 1/2008 | Hara et al. | 709/218 |
| 7,458,082 B1 | 11/2008 | Slaughter et al. | 719/328 |
| 7,478,113 B1 | 1/2009 | De Spiegeleer | |
| 7,526,478 B2 | 4/2009 | Friedman | |
| 7,533,291 B2 * | 5/2009 | Lin | 714/6 |
| 7,650,341 B1 * | 1/2010 | Oratovsky et al. | 1/1 |
| 7,860,706 B2 | 12/2010 | Abir | |
| 8,095,516 B2 | 1/2012 | Margolus et al. | |
| 2002/0002468 A1 | 1/2002 | Spagna et al. | |
| 2002/0019814 A1 | 2/2002 | Ganesan | |
| 2002/0038296 A1 | 3/2002 | Margolus et al. | |
| 2002/0059317 A1 | 5/2002 | Black et al. | |
| 2002/0107803 A1 | 8/2002 | Lisanke et al. | |
| 2002/0107877 A1 | 8/2002 | Whiting et al. | |
| 2002/0116402 A1 | 8/2002 | Luke | |
| 2002/0120925 A1 | 8/2002 | Logan | |
| 2002/0138376 A1 | 9/2002 | Hinkle | |
| 2002/0140960 A1 | 10/2002 | Ishikawa | |
| 2002/0143737 A1 | 10/2002 | Seki et al. | |
| 2002/0143871 A1 | 10/2002 | Meyer et al. | |
| 2002/0147733 A1 | 10/2002 | Gold et al. | |
| 2002/0161745 A1 | 10/2002 | Call | 707/1 |
| 2002/0178176 A1 * | 11/2002 | Sekiguchi et al. | 707/200 |
| 2002/0193986 A1 | 12/2002 | Schirris | |
| 2002/0194324 A1 | 12/2002 | Guha | |
| 2003/0028889 A1 | 2/2003 | McCoskey et al. | |
| 2003/0069803 A1 | 4/2003 | Pollitt | |
| 2003/0069877 A1 | 4/2003 | Grefenstette et al. | |
| 2003/0093790 A1 | 5/2003 | Logan et al. | |
| 2003/0105718 A1 | 6/2003 | Hurtado et al. | |
| 2003/0110130 A1 | 6/2003 | Pelletier | |
| 2003/0126247 A1 * | 7/2003 | Strasser et al. | 709/223 |
| 2003/0126362 A1 | 7/2003 | Camble et al. | |
| 2003/0135464 A1 | 7/2003 | Mourad et al. | |
| 2003/0145209 A1 | 7/2003 | Eagle et al. | |
| 2003/0182304 A1 | 9/2003 | Summerlin et al. | |
| 2003/0233455 A1 * | 12/2003 | Leber et al. | 709/226 |
| 2004/0003132 A1 | 1/2004 | Stanley et al. | |
| 2004/0034550 A1 | 2/2004 | Menschik et al. | |
| 2004/0034632 A1 | 2/2004 | Carmel et al. | |
| 2004/0054630 A1 | 3/2004 | Ginter et al. | |
| 2004/0064447 A1 | 4/2004 | Simske et al. | |
| 2004/0064537 A1 | 4/2004 | Anderson et al. | |
| 2004/0068604 A1 | 4/2004 | Le et al. | |
| 2004/0083211 A1 | 4/2004 | Bradford | 707/3 |
| 2004/0143609 A1 * | 7/2004 | Gardner et al. | 707/204 |
| 2004/0158559 A1 | 8/2004 | Poltorak | 707/3 |
| 2004/0168058 A1 | 8/2004 | Margolus | |
| 2004/0186827 A1 | 9/2004 | Anick et al. | |
| 2004/0193695 A1 | 9/2004 | Salo et al. | |
| 2004/0205448 A1 | 10/2004 | Grefenstette et al. | |
| 2005/0076293 A1 | 4/2005 | Beresnevichiene | |
| 2005/0097081 A1 | 5/2005 | Sellen et al. | |
| 2005/0097092 A1 | 5/2005 | Annau et al. | |
| 2005/0114282 A1 | 5/2005 | Todhunter | |
| 2005/0114370 A1 | 5/2005 | Lewak et al. | |
| 2005/0144157 A1 | 6/2005 | Moody et al. | |
| 2005/0160481 A1 | 7/2005 | Todd et al. | |
| 2005/0223067 A1 | 10/2005 | Buchheit et al. | |
| 2005/0234843 A1 | 10/2005 | Beckius et al. | |
| 2005/0283473 A1 | 12/2005 | Rousso et al. | |
| 2006/0026220 A1 | 2/2006 | Margolus | |
| 2006/0122998 A1 | 6/2006 | Bar-Yossef et al. | |
| 2006/0167679 A1 | 7/2006 | Tsai et al. | |
| 2006/0167842 A1 | 7/2006 | Watson | 707/3 |
| 2006/0173824 A1 | 8/2006 | Bensky et al. | |
| 2006/0230035 A1 | 10/2006 | Bailey et al. | |
| 2006/0265209 A1 | 11/2006 | Bradford | |
| 2006/0271526 A1 | 11/2006 | Charnock et al. | |
| 2007/0011154 A1 | 1/2007 | Musgrove et al. | |
| 2007/0022134 A1 | 1/2007 | Zhou et al. | |
| 2007/0030528 A1 | 2/2007 | Quaeler et al. | |
| 2007/0033177 A1 | 2/2007 | Friedman | |
| 2007/0033183 A1 | 2/2007 | Friedman | |
| 2007/0033410 A1 | 2/2007 | Eagle et al. | 713/176 |
| 2007/0038616 A1 | 2/2007 | Guha | |
| 2007/0050339 A1 | 3/2007 | Kasperski et al. | 707/3 |
| 2007/0050351 A1 | 3/2007 | Kasperski et al. | 707/4 |
| 2007/0061335 A1 | 3/2007 | Ramer et al. | |
| 2007/0088687 A1 | 4/2007 | Bromm et al. | |
| 2007/0192284 A1 | 8/2007 | Finley et al. | |
| 2007/0198470 A1 | 8/2007 | Freedman et al. | |
| 2007/0233692 A1 | 10/2007 | Lisa et al. | |
| 2007/0245108 A1 * | 10/2007 | Yasaki et al. | 711/163 |
| 2007/0253643 A1 | 11/2007 | Nagarajan | |
| 2007/0255686 A1 | 11/2007 | Kemp et al. | |
| 2007/0266009 A1 | 11/2007 | Williams | |
| 2007/0282811 A1 | 12/2007 | Musgrove | |
| 2007/0282826 A1 | 12/2007 | Hoeber et al. | |
| 2007/0288445 A1 | 12/2007 | Kraftsow | |
| 2007/0288450 A1 | 12/2007 | Datta et al. | |
| 2008/0005651 A1 | 1/2008 | Grefenstette et al. | |
| 2008/0059187 A1 | 3/2008 | Roitblat et al. | |
| 2008/0059512 A1 | 3/2008 | Roitblat et al. | |
| 2008/0077570 A1 | 3/2008 | Tang et al. | |
| 2008/0097975 A1 | 4/2008 | Guay et al. | |
| 2008/0104032 A1 | 5/2008 | Sarkar | |
| 2008/0133570 A1 | 6/2008 | Allen et al. | |
| 2008/0147644 A1 | 6/2008 | Aridor et al. | |
| 2008/0155192 A1 | 6/2008 | Iitsuka | |
| 2008/0162498 A1 | 7/2008 | Omoigui | |
| 2008/0189273 A1 | 8/2008 | Kraftsow et al. | |
| 2008/0195601 A1 | 8/2008 | Ntoulas et al. | |
| 2008/0235202 A1 | 9/2008 | Wang et al. | |
| 2008/0288474 A1 | 11/2008 | Chin et al. | |
| 2009/0024612 A1 | 1/2009 | Tang et al. | |
| 2009/0182737 A1 | 7/2009 | Melman | |
| 2009/0182789 A1 | 7/2009 | Sandorfi et al. | |

(56) References Cited

U.S. PATENT DOCUMENTS

| | | |
|---|---|---|
| 2009/0287685 A1 | 11/2009 | Charnock et al. |
| 2009/0313248 A1 | 12/2009 | Balachandran et al. |
| 2009/0327625 A1 | 12/2009 | Jaquette et al. |

FOREIGN PATENT DOCUMENTS

| | | |
|---|---|---|
| JP | 2004213237 A | 7/2004 |
| WO | WO 03/019412 A2 | 3/2003 |
| WO | WO 2008/080140 A2 | 7/2008 |

OTHER PUBLICATIONS

Attar et al., "Local Feedback in Full-Text Retrieval Systems", Journal of the ACM (JACM), vol. 24, Issue 3 (Jul. 1977), pp. 397-417, ISSN:0004-5411.

Cai et al., "Automatic Query Expansion Based on Directed Divergence", Proceedings of the International Conference on Information Technology: Coding and Computing, p. 8, 2002, ISBN:0-7695-1506-1.

Cohen, E. et al.; "Processing Top k Queries from Samples"; ACM.

Conlon, S., "Automatic Web Searching and Categorizing Using Query Expansion and Focusing", (Mississippi University.), 6p, Jan. 2003.

Crestani, F. et al.; "Is This Document Relevant? . . . Probably": A Survey of Probabilistic Models in Information Retrieval; ACM Computing Surveys vol. 30, No. 4, Dec. 1998.

E. M. Voorhees, "Query expansion using lexical-semantic relations", Annual ACM Conference on Research and Development in Information Retrieval, Proceedings of the 17th annual international ACM SIGIR conference on Research and development in information retrieval, 1994, Dublin, Ireland, Aug. 1994, pp. 61-69, ISBN:0-387-1988-X.

Gauch et al., "A Corpus Analysis Approach for Automatic Query Expansion and Its Extension to Multiple Databases" ACM Transactions on Information Systems, vol. 17, No. 3, Jul. 1999, pp. 250-269.

Gehler, P. et al.; "The Rate Adapting Poisson Model for Information Retrieval and Object Recognition"; Proceedings of the 23rd International Conference on Machine Learning, 2006.

http://www.googleguide.com/tools.html <retrieved on Jul. 8, 2009>.

http://www.lexisnexis.com/toolbar/help/using.

htm#HighlightAndClick <retrieved on Jul. 8, 2009>.

Ilyas, I. et al.; "Adaptive Rank-Aware Query Optimization in Relational Databases"; ACM Transactions on Database Systems; vol. 31. No. 4, Dec. 2006.

Luk, R. et al.; "A Comparison of Chinese Document Indexing Strategies and Retrieval Models"; ACM Transactions on Asian Language Information Processing, vol. 1, No. 3, Sep. 2002.

Margulis, E.; "Modelling Documents with Multiple Poisson Distributions"; Information Processing & Management vol. 29, No. 2, 1993.

Margulis, E.; "N-Poisson Document Modelling"; SIGIR '92.

Mei, Q. et al.; "A Study of Poisson Query Generation Model for Information Retrieval"; SIGIR '07 Proceedings, Session 12: Formal Models.

Mitra et al., "Improving Automatic Query Expansion", Annual ACM Conference on Research and Development in Information Retrieval, Proceedings of the 21st annual international ACM SIGIR conference on Research and development in information retrieval, Melbourne, Australia, pp. 206-214, Year of Publication: 1998, ISBN:1-58113-015-5.

Ozmutlu, H. et al.; "Analysis of large data logs: an application of Poisson sampling on excite web queries"; Information Processing and Management, vol. 38, 2002.

Robertson, S. et al.; "Some Simple Effective Approximations to the 2-Poisson Model for Probabilistic Weighted Retreival"; Centre for Interactive Systems Research, London.

Roelleke, T.; "A Frequency-based and a Poisson-based Definition of the Probability of Being Informative"; SIGIR '03.

Tao, Y. et al.; "Indexing Multi-Dimensional Uncertain Data with Arbitrary Probability Density Functions"; Proceedings of the 31st VLDB Conference, Norway 2005.

Volkmer et al., "Exploring Automatic Query Refinement for Text-Based Video Retrieval", IEEE International Conference on Multimedia and Expo, Jul. 9-12, 2006, pp. 765-768, Toronto, Ont., ISBN: 1-4244-0366-7.

Xu et al., "Query expansion using local and global document analysis," in Proc. of ACM-SIGIR 1996, Zurich, Switzerland, Aug. 18-22, 1996, pp. 4-11.

Yan, T. et al.; "The SIFT Information Dissemination System"; ACM Transactions on Database Systems, vol. 24, No. 4, Dec. 1999.

Zakariah, R. et al.; "Detecting Junk Mails by Implementing Statistical Theory"; IEEE Proceedings of the 20th International Conference on Advanced Information Networking and Applications, 2006.

Roitblat, Herbert L. (2004), "Electronic Data Are Increasingly Important to Successful Litigation", Trends in Electronic Data.

Roitblat, Herbert L. (2005), "Document Retrieval", DolphinSearch, Inc.

"The Sedona Principles: Best Practices Recommendations & Principles for Addressing Electronic Document Production," The Sedona Conference Working Group Series, Jul. 2005 Version.

Meng, W., et al., "Building Efficient and Effective Metasearch Engines," ACM Computing Surveys, ACM, New York, NY, US, US, vol. 34, No. 1, Mar. 1, 2002, pp. 48-89.

Comparing IBM Tivoli Storage Manager and VERITAS NetBackup in Real-World Environments. A summary by IBM of the whitepaper and benchmark written by Progressive Strategies, Nov. 8, 2002.

Beyond Backup Toward Storage Management by M. Kaczmarski, T. Jiang and D.A. Pease. IBM Systems Journal, vol. 42, pp. 322-337, Nov. 2, 2003.

PCT Search Report and Written Opinion dated Jun. 18, 2008, PCT/US07/13483.

PCT Search Report and Written Opinion dated May 8, 2009, PCT/US2009/032990.

Mosher, Sue, "Outlook Tips and Techniques," Windows IT Pro, Feb. 12, 2001.

International Search Report and Written Opinion from PCT/US2010/060899 dated Mar. 3, 2011.

International Search Report and Written Opinion from PCT/US2010/059775 dated Mar. 16, 2011.

International Search Report and Written Opinion from PCT/US11/22472 dated Mar. 30, 2011.

International Search Report and Written Opinion from PCT/US11/26924 dated Apr. 29, 2011.

\* cited by examiner

METHOD AND SYSTEM FOR RESTORING INFORMATION FROM BACKUP STORAGE MEDIA

TECHNICAL FIELD

The disclosures herein relate in general to computer systems, and in particular to a method and system for restoring information from backup storage media.

SUMMARY

First and second partial files are read from first and second storage media, respectively, irrespective of a sequence in which the first and second storage media were originally written relative to one another. The first partial file forms a first portion of a complete file. The second partial file forms a second portion of the complete file. The first and second partial files are combined to extract and form the complete file, without dependence on re-reading the first and second storage media.

DETAILED DESCRIPTION

Figure 1:
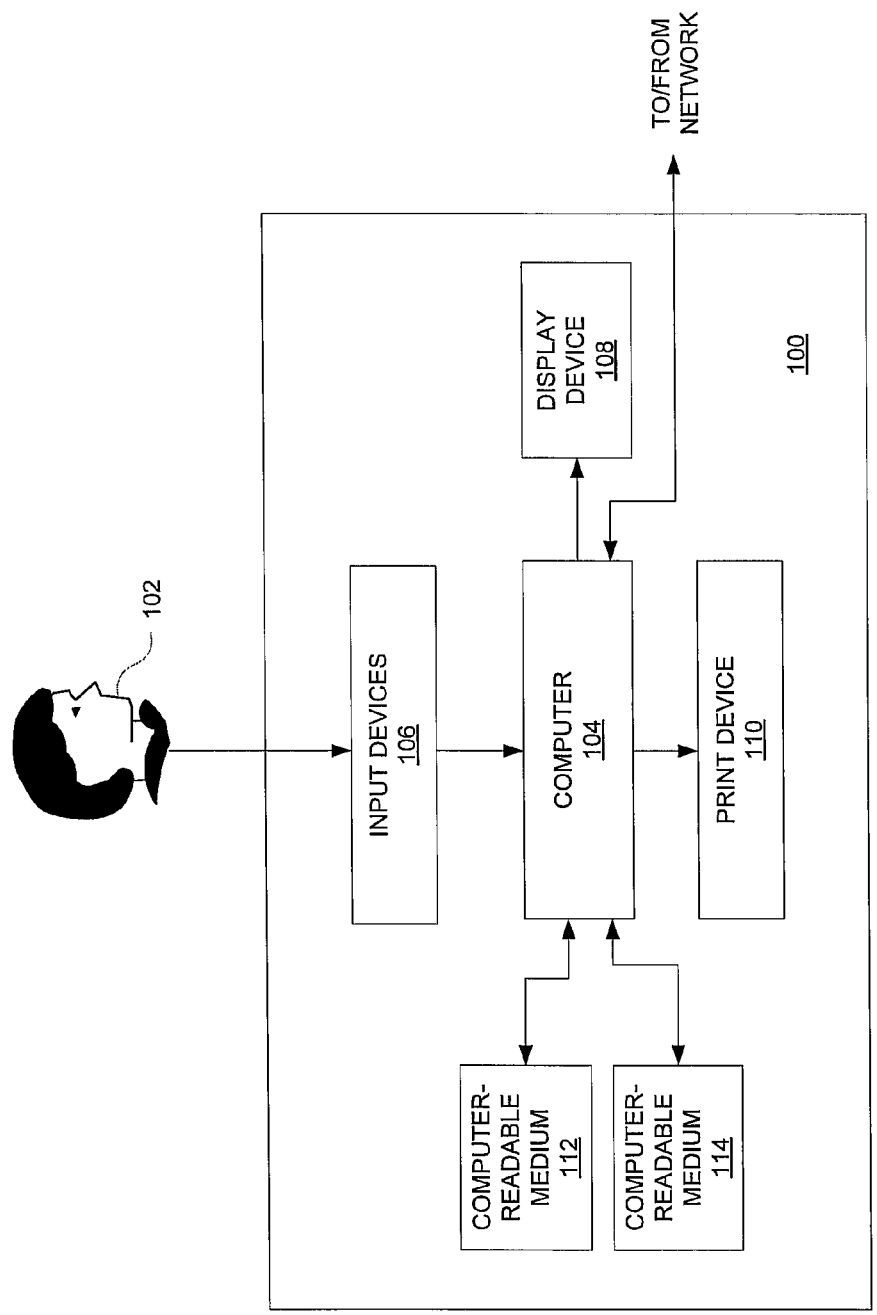
FIG. 1 is a block diagram of an information handling system, according to the illustrative embodiment.

FIG. 1 is a block diagram of an information handling system, indicated generally at 100, according to the illustrative embodiment. In the example of FIG. 1, the system 100 operates in association with a human user 102. The system 100 is formed by various electronic circuitry components, including: (a) a general purpose computer 104, such as a workstation or server, for executing and otherwise processing instructions, and for performing additional operations (e.g., communicating information) in response thereto, as discussed further hereinbelow; (b) input devices 106 for receiving information from the user 102; (c) a display device 108 (e.g., a conventional flat panel monitor) for displaying information to the user 102; (d) a print device 110 (e.g., a conventional electronic printer or plotter) for printing visual images on paper; (e) a computer-readable medium (or apparatus) 112 (e.g., a hard disk drive or other nonvolatile storage device) for storing information; (f) a portable computer-readable medium (or apparatus) 114 (e.g., a portable hard disk drive, flash memory card, CD-ROM, or magnetic tape) for storing information; and (g) various other electronic circuitry for performing other operations of the system 100.

Accordingly, in the example of FIG. 1, the computer 104 is connected to the input devices 106, the display device 108, the print device 110, the computer-readable medium 112, and the computer-readable medium 114, as shown in FIG. 1. Also, for example, the computer 104 includes a memory device (e.g., random access memory ("RAM") device and/or read only memory ("ROM") device) for storing information (e.g., instructions of software executed by the computer 104, and data processed by the computer 104 in response to such instructions).

In response to signals from the computer 104, the display device 108 displays visual images, which represent information, and the user 102 views such visual images. Moreover, the user 102 operates the input devices 106 to output information to the computer 104, and the computer 104 receives such information from the input devices 106. Also, in response to signals from the computer 104, the print device 110 prints visual images on paper, and the user 102 views such visual images.

The input devices 106 include, for example, a conventional electronic keyboard (or keypad) and a pointing device, such as a conventional electronic "mouse," rollerball or light pen. The user 102 operates the keyboard (or keypad) to output alphanumeric text information to the computer 104, which receives such alphanumeric text information. The user 102 operates the pointing device to output cursor-control information to the computer 104, and the computer 104 receives such cursor-control information. The input devices 106 also include, for example, touch-sensitive circuitry of a liquid crystal display ("LCD") device.

The computer 104 is coupled through a network to various other devices (not shown in FIG. 1). Through such network, the computer 104 outputs information (e.g., instructions, data, signals) to such devices, which receive and operate in response to such information. In one example, such information is specified by the user 102 to the computer 104 through the input devices 106. Also, through such network, such devices output information to the computer 104, which receives and operates in response to such information. In one example, such information is output by the computer 104 for display to the user 102 through the display device 108 and the print device 110, in response to command(s) from the user 102.

In one embodiment: (a) the computer-readable medium (or apparatus) 114 includes a backup tape storage medium (e.g., magnetic tape for storing digital information); and (b) the computer 104 (and/or such apparatus in response to signals from the computer 104) includes circuitry for writing information to, and reading information from, such backup tape(s). For clarity, in FIG. 2, FIG. 3 and FIG. 4, and in the detailed description hereinbelow, various references are made to one or more backup tape storage media (or "backup tapes" or "tapes"), but such references likewise apply to the computer-readable medium 114 generally, in any of its various embodiments (e.g., a portable hard disk drive, flash memory card, CD-ROM, or other persistent data storage medium). For example, the user 112 may operate the system 100 to copy an image from one or more backup tape storage media to the computer-readable medium 114 (e.g., embodied as a hard disk drive), so that the system 100 restores information (as discussed further hereinbelow in connection with FIG. 2, FIG. 3 and FIG. 4) in response to the image on the computer-readable medium 114.

Figure 2:
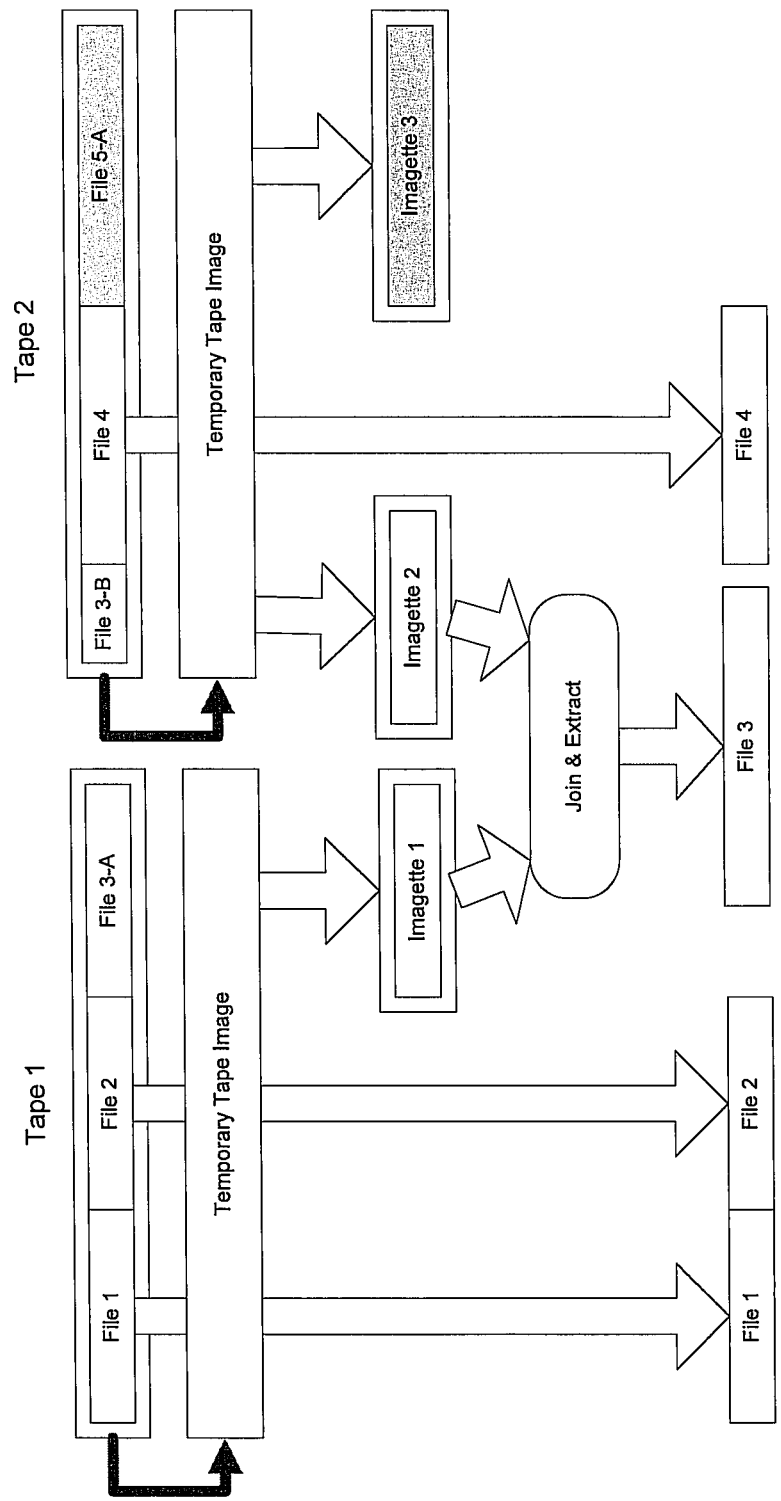
FIG. 2 is a first flow diagram of information restored from backup storage media by the system of FIG. 1, according to the illustrative embodiment.

FIG. 2 is a first flow diagram of information restored from backup storage media by the system 100, according to the illustrative embodiment. In the example of FIG. 2, the backup storage media are shown as a set of tapes, namely a Tape 1 and a Tape 2. In another example, the backup storage media include one or more other embodiments of the computer-readable medium 114 (e.g., embodied as a hard disk drive), onto which an image was copied from one or more backup tape storage media.

Vast amounts of active and archived electronic information may exist on backup tape storage media. Conventional methods of restoring such information from large quantities of backup tapes are difficult to implement, cost prohibitive, or both. Restoring such information is especially difficult for companies that have multiple systems with different backup tape environments.

In a first mode of operation, the system 100 restores such information by replicating (and operating in) a native environment with which the backup tapes were originally written ("NE"), so that the system 100: (a) restores such information from the backup tapes; and (b) after restoring such information, writes such information to a target storage device (e.g., the computer-readable medium 112) for storage and further processing (e.g., analysis) by the system 100. Nevertheless, such replication of the NE is challenging if the NE becomes outdated by new technology (e.g., if the NE's hardware or software is lost or malfunctions and is difficult to repair or replace), or if key parameters of the NE become lost.

In a second mode of operation, the system 100 operates with a non-native environment ("NNE") that is significantly different from the NE, yet the system 100 still: (a) restores such information from the backup tapes; and (b) after restoring such information, writes such information to a target storage device (e.g., the computer-readable medium 112) for storage and further processing (e.g., analysis) by the system 100. In that manner, the system 100 operates with more speed and efficiency, because it operates without replicating the NE. For example, by operating in the NNE, the system 100 restores such information from backup tapes of various NEs, in a manner that achieves more parallel processing.

For operating in the NNE, the system 100 communicates with the backup tapes' hardware and restores information from the backup tapes, according to specified protocols and formats of: (a) such hardware; and (b) other significant aspects of the NE (e.g., specified protocols and formats of the NE's software and information stored therewith). Accordingly, the system 100 is programmed to: (a) read information from the backup tapes; (b) analyze patterns within such information (e.g., sequences, byte signatures, and other identifiers); (c) in response to such analysis, identify such hardware and other significant aspects of the NE; and (d) in response to such identification, read (e.g., from a memory of the system 100) and execute the specified protocols and formats (e.g., metadata formats) for restoring information from the backup tapes.

Frequently, the backup storage media include many tapes that store large amounts of information. A particular file's information may, or may not, be stored at contiguous addresses on one or more tapes. Accordingly, a particular file's location on the tape(s) may be specified by: (a) starting, ending, or intermediate address(es) for the information; (b) potentially starting, ending, or intermediate address(es) for discontinuous portions of the information; or (c) any combination thereof.

The system 100 restores information from the backup storage media, even if: (a) the backup storage media include many tapes that store large amounts of information; and (b) any particular file's information is potentially stored at contiguous addresses on multiple ones of those tapes; and (c) a sequential order of such tapes is unknown. In either of the first or second modes of operation (as selected by the user 102), which are discussed further hereinabove, the system 100 restores information from all such tapes, according to the techniques discussed further hereinbelow in connection with FIG. 2, FIG. 3 and FIG. 4. The tapes store information as one or more files. In the example of FIG. 2, the Tape 1 stores information as a File 1, a File 2, and a File 3-A. The File 1 and the File 2 are complete files. The File 3-A is a partial file, so that it forms a first portion of a File 3. At least one additional portion of the File 3 is stored by at least one additional tape.

As shown in FIG. 2, the Tape 2 stores information as a File 3-B, a File 4, and a File 5-A. The File 4 is a complete file. The File 3-B is a partial file, so that it forms a second portion of the File 3. Together, the File 3-A and the File 3-B form the complete File 3.

The File 5-A is a partial file, so that it forms a portion of a File 5. However, in this example, either: (a) at least one additional portion of the File 5 is stored by at least one additional tape, which is lost or malfunctioning; or (b) the File 5-A itself has an error, so that it contains insufficient information for completing the File 5 (e.g., insufficient information for linking to another File 5-B on another tape).

As shown in FIG. 2, the system 100 reads the set of tapes (e.g., one tape at a time, or multiple tapes in parallel with one another), irrespective of an original sequence of the tapes relative to one another (e.g., irrespective of a sequence in which the tapes were originally written relative to one another). For instance, in the example of FIG. 2, the system 100 is adaptable to preferences of the user 102, so that the system 100 is suitable for reading: (a) the Tape 1 before the Tape 2; (b) the Tape 2 before the Tape 1; or (c) the Tape 1 and the Tape 2 in parallel with one another.

In response to reading a tape, the system 100: (a) generates and temporarily stores an image of such tape, such as the temporary tape images shown in FIG. 2; and (b) identifies, extracts and writes (to a target storage device, such as the computer-readable medium 112) complete files that exist on such tape, so that the target storage device stores such complete files. For instance, in the example of FIG. 2, the system 100 identifies, extracts and writes (to the target storage device): (a) the complete File 1 and the complete File 2 that exist on the Tape 1; and (b) the complete File 4 that exists on the Tape 2.

Moreover, in response to the temporary tape image of such tape, the system 100 identifies and temporarily stores (in partial images, or "imagettes") partial files that exist on such tape. For instance, in the example of FIG. 2, the system 100 identifies and temporarily stores: (a) an Imagette 1 of the partial File 3-A that exists on the Tape 1; (b) an Imagette 2 of the partial File 3-B that exists on the Tape 2; and (c) an Imagette 3 of the partial File 5-A that exists on the Tape 2.

After the system 100 stores all imagettes of a complete file, the system 100: (a) executes join & extract instructions (e.g., software instructions) for combining such imagettes to extract and form the complete file; and (b) writes the complete file to the target storage device, so that the target storage device stores such complete file. For instance, in the example of FIG. 2, after the system 100 stores the Imagette 1 (of the partial File 3-A) and the Imagette 2 (of the partial File 3-B), the system 100: (a) executes the join & extract instructions for combining the Imagette 1 and the Imagette 2 to extract and form the complete File 3; and (b) writes the complete File 3 to the target storage device.

As discussed hereinabove, with respect to the File 5-A, either: (a) at least one additional portion of the File 5 is stored by at least one additional tape, which is lost or malfunctioning; or (b) the File 5-A itself has an error, so that it contains insufficient information for completing the File 5 (e.g., insufficient information for linking to another File 5-B on another tape). In response to this situation, the system 100 writes the Imagette 3 (of the File 5-A) to the target storage device for storage and further processing (e.g., analysis) by the system 100 to potentially recover information from the Imagette 3.

Figure 3:
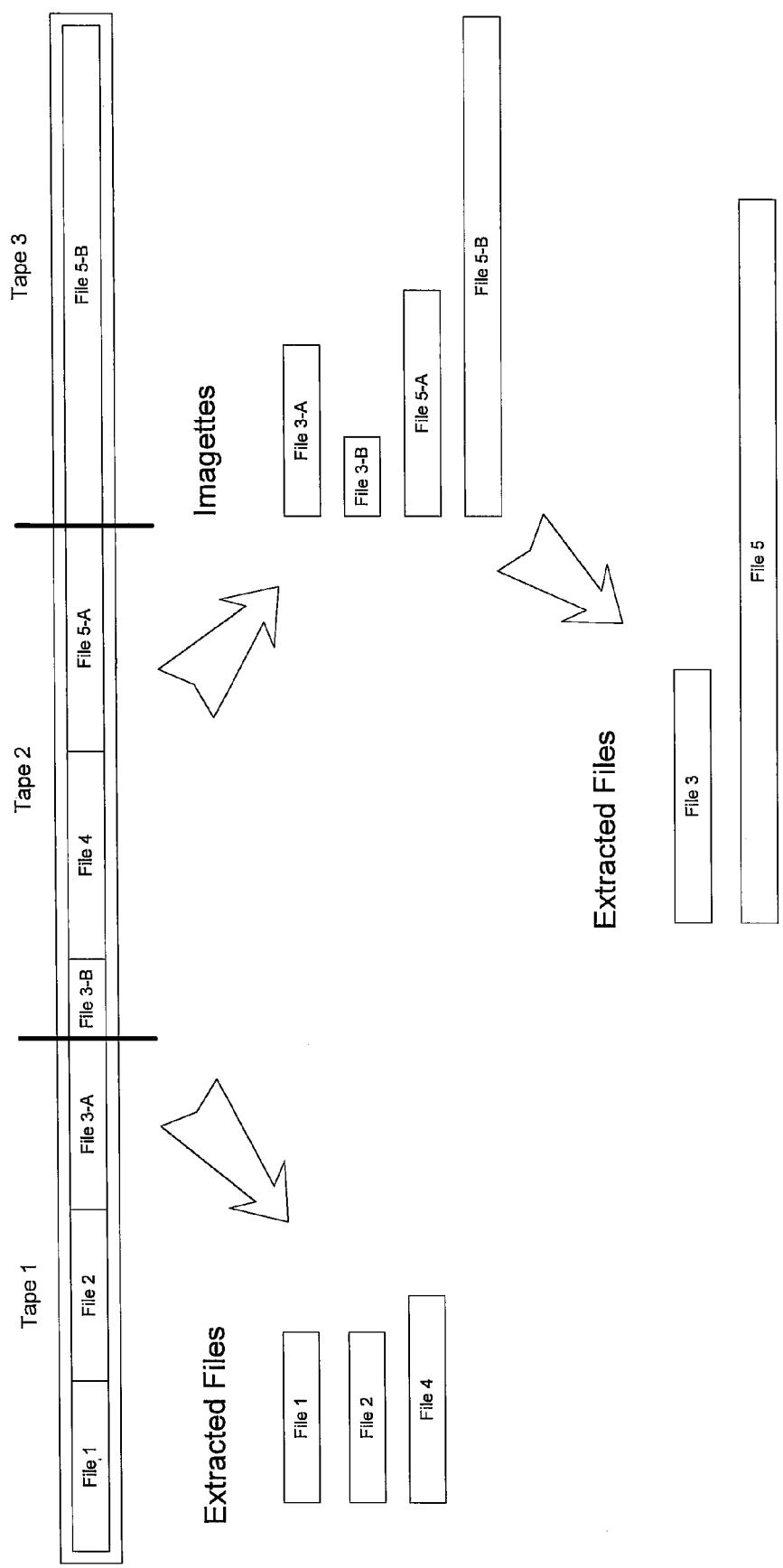
FIG. 3 is a second flow diagram of information restored from backup storage media by the system of FIG. 1, according to the illustrative embodiment.

FIG. 3 is a second flow diagram of information restored from backup storage media by the system 100, according to the illustrative embodiment. The example of FIG. 3 is identical to the example of FIG. 2, except that the set of tapes in FIG. 3 includes an additional Tape 3, which stores information as a File 5-B. The File 5-B is a partial file, so that it forms a second portion of the File 5. Together, the File 5-A and the File 5-B form the complete File 5.

In the example of FIG. 3, as in the example of FIG. 2, the system 100 is adaptable to preferences of the user 102, so that the system 100 is suitable for reading the Tape 1, the Tape 2, and the Tape 3 in any order, or in parallel with one another, irrespective of an original sequence of the tapes relative to one another (e.g., irrespective of a sequence in which the tapes were originally written relative to one another). Likewise, in the example of FIG. 3, as in the example of FIG. 2, the system 100 identifies, extracts and writes (to the target storage device): (a) the complete File 1 and the complete File 2 that exist on the Tape 1; and (b) the complete File 4 that exists on the Tape 2.

Similarly, in the example of FIG. 3, the system 100 identifies and temporarily stores respective imagettes of: (a) the partial File 3-A that exists on the Tape 1; (b) the partial File 3-B and the partial File 5-A that exist on the Tape 2; and (c) the partial File 5-B that exists on the Tape 3. After the system 100 stores such imagettes, the system 100 executes the join & extract instructions for: (a) combining the imagette of the partial File 3-A and the imagette of the partial File 3-B to extract and form the complete File 3; and (b) combining the imagette of the partial File 5-A and the imagette of the partial File 5-B to extract and form the complete File 5.

After forming the complete File 3, the system 100 writes it to the target storage device. Likewise, after forming the complete File 5, the system 100 writes it to the target storage device.

Figure 4:
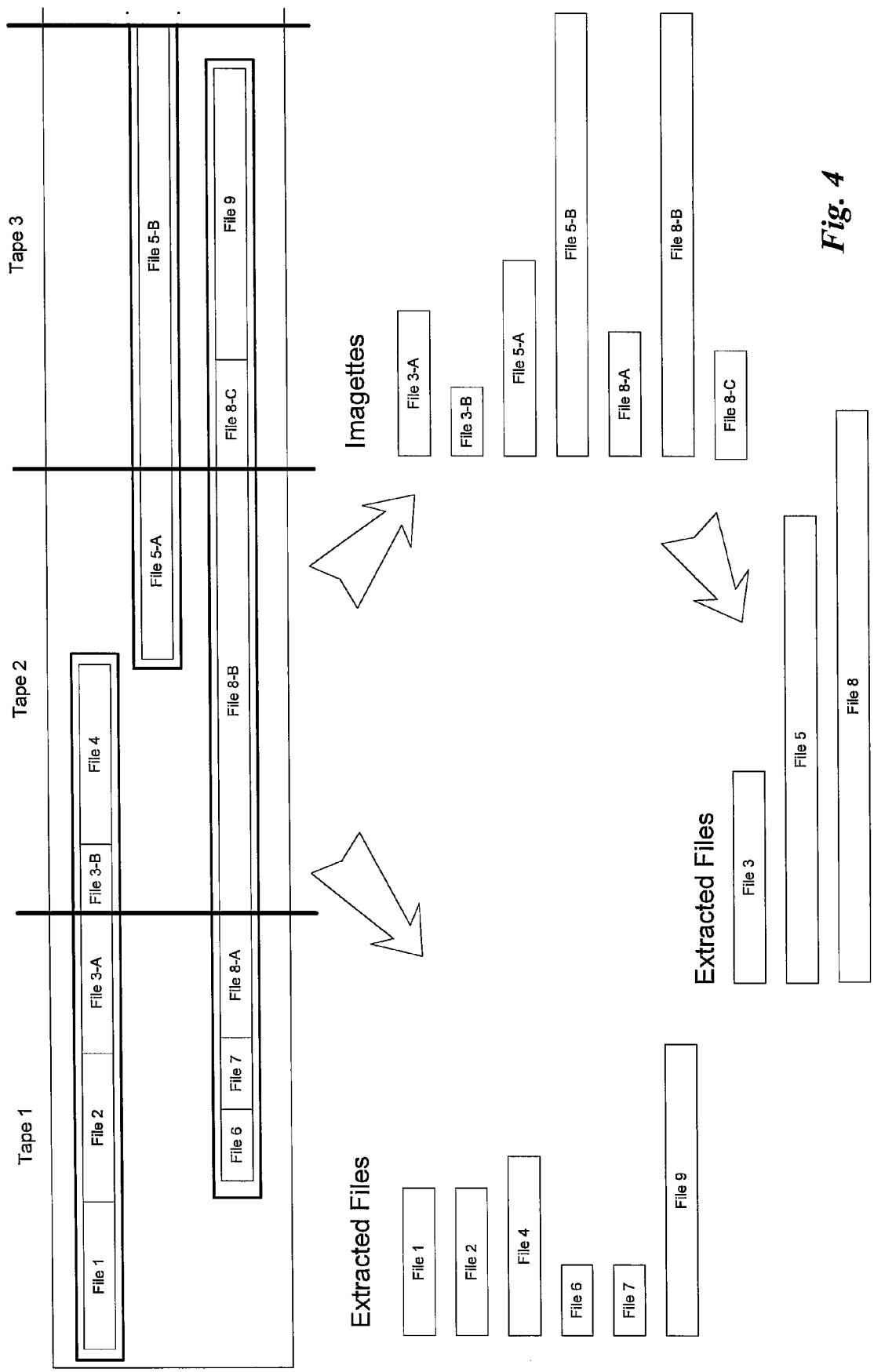
FIG. 4 is a third flow diagram of information restored from backup storage media by the system of FIG. 1, according to the illustrative embodiment.

FIG. 4 is a third flow diagram of information restored from backup storage media by the system 100, according to the illustrative embodiment. The example of FIG. 4 is identical to the example of FIG. 3, except that: (a) the Tape 1 stores more information as an additional File 6, an additional File 7, and an additional File 8-A; (b) the Tape 2 stores more information as an additional File 8B; and (c) the Tape 3 stores more information as an additional File 8-C and an additional File 9. The File 6, the File 7, and the File 9 are complete files. The File 8-A, the File 8-B, and the File 8-C are partial files, which together form the complete File 8.

As shown in FIG. 4: (a) the File 1, the File 2, the File 3-A, the File 3-B and the File 4 were written onto the backup storage media (Tape 1, Tape 2) in a first backup session; (b) the File 5-A and the File 5-B were written onto the backup storage media (Tape 2, Tape 3) in a second backup session; and (c) the File 6, the File 7, the File 8-A, the File 8-B, the File 8-C and the File 9 were written onto the backup storage media (Tape 1, Tape 2, Tape 3) in a third backup session.

In the example of FIG. 4, as in the example of FIG. 3, the system 100 identifies, extracts and writes (to the target storage device): (a) the complete File 1 and the complete File 2 that exist on the Tape 1; and (b) the complete File 4 that exists on the Tape 2. Moreover, in the example of FIG. 4, the system 100 identifies, extracts and writes (to the target storage device): (a) the complete File 6 and the complete File 7 that exist on the Tape 1; and (b) the complete File 9 that exists on the Tape 3. The system 100 is operable to perform subsequent operations in response to such File 1, File 2, File 4, File 6, File 7 and File 9 that are stored by the target storage device.

Similarly, in the example of FIG. 4, the system 100 identifies and temporarily stores respective imagettes of: (a) the partial File 3-A and the partial File 8-A that exist on the Tape 1; (b) the partial File 3-B, the partial File 5-A, and the partial File 8-B that exist on the Tape 2; and (c) the partial File 5-B and the partial File 8-C that exist on the Tape 3.

After the system 100 stores such imagettes, the system 100 executes the join & extract instructions for: (a) combining the imagette of the partial File 3-A and the imagette of the partial File 3-B to extract and form the complete File 3; (b) combining the imagette of the partial File 5-A and the imagette of the partial File 5-B to extract and form the complete File 5; and (c) combining the imagette of the partial File 8-A, the imagette of the partial File 8-B, and the imagette of the partial File 8-C to extract and form the complete File 8.

After forming the complete File 3, the system 100 writes it to the target storage device. Likewise: (a) after forming the complete File 5, the system 100 writes it to the target storage device; and (b) after forming the complete File 8, the system 100 writes it to the target storage device. The system 100 is operable to perform subsequent operations in response to such File 3, File 5 and File 8 that are stored by the target storage device.

According to the techniques of FIG. 2, FIG. 3 and FIG. 4, the system 100 reads the set of tapes in a single pass to restore the information from such tapes, irrespective of an original sequence of such tapes relative to one another (e.g., irrespective of a sequence in which the tapes were originally written relative to one another), and without dependence on re-reading such tapes in a subsequent pass, and even if such tapes have various media types that differ from one another (e.g., even if such tapes have various media types that differ from one another on a tape-by-tape basis). This single pass technique is superior to previous techniques that: (a) in a first pass, read the set of tapes to determine an original sequence of such tapes relative to one another; and (b) in a second pass, re-read such tapes in such original sequence to restore the information from such tapes. Such previous techniques consume more time and human effort in loading and unloading the various tapes during the first and second passes.

In the illustrative embodiment, the system 100 stores the imagettes in a non-native format that is (a) different from a native format in which such imagettes were originally written to the tapes, yet (b) more efficient for subsequent operations of the system 100. In one version of the illustrative embodiment, such non-native format is substantially similar to (yet different from) the native format. In an alternative embodiment, the system 100 stores the imagettes in the native format.

Referring again to FIG. 1, the computer 104 and the computer-readable medium 114 are structurally and functionally interrelated with one another, as described further hereinbelow. In that regard, the computer-readable medium 114 is a representative one of the computer-readable media of the system 100 (including, but not limited to, the computer-readable medium 112). The computer-readable medium 114 stores (or encodes, or records, or embodies) functional descriptive material (including, but not limited to, software and data structures). Such functional descriptive material imparts functionality when encoded on the computer-readable medium 114.

Also, such functional descriptive material is structurally and functionally interrelated to the computer-readable medium 114.

Within such functional descriptive material, data structures define structural and functional interrelationships between such data structures and the computer-readable medium 114 (and other aspects of the computer 104 and the system 100). Such interrelationships permit the data structures' functionality to be realized. Also, within such functional descriptive material, software (also referred to as computer programs or applications) defines structural and functional interrelationships between such software and the computer-readable medium 114 (and other aspects of the computer 104 and the system 100). Such interrelationships permit the software's functionality to be realized.

For example, the computer 104 reads (or accesses, or copies) such functional descriptive material from the computer-readable medium 114 into the memory device of the computer 104, and the computer 104 performs its operations (as described elsewhere herein) in response to such material, which is stored in the memory device of the computer 104. More particularly, the computer 104 performs the operation of processing software (which is stored, encoded, recorded or embodied on a computer-readable medium) for causing the computer 104 to perform additional operations (as described elsewhere herein). Accordingly, such functional descriptive material exhibits a functional interrelationship with the way in which the computer 104 executes its processes and performs its operations.

Further, the computer-readable media of the system 100 are apparatus from which the software is accessible by the computer 104, and the software is processable by the computer 104 for causing the computer 104 to perform such additional operations. In addition to reading such functional descriptive material from the computer-readable medium 114, the computer 104 is capable of reading such functional descriptive material from (or through) a network, which is also a computer-readable medium (or apparatus) of the system 100. Moreover, the memory device of the computer 104 is itself a computer-readable medium (or apparatus) of the system 100.

Although illustrative embodiments have been shown and described, a wide range of modification, change and substitution is contemplated in the foregoing disclosure. In some instances, various features of the embodiments may be used without a corresponding use of other features.

What is claimed is:

1. A method for restoring data from backup storage media performed by an information handling system utilizing at least one computing device, the method comprising the steps of:
    reading first and second partial files from first and second backup storage media, respectively, irrespective of a sequence in which the first and second backup storage media were originally written relative to one another and without replicating a native environment in which the first and second backup storage media were written, and wherein the first and second backup storage media have respective media types that differ from one another;
    wherein a second partial file of the first and second partial files forms a second portion of a complete file; and
    combining the first and second partial files to extract and form the complete file, without dependence on re-reading the first and second backup storage media;
    writing the complete file to a target storage; and
    performing an operation in response to the complete file that is stored in the target storage; and wherein the complete file is a first complete file and further comprising the step of:
    reading a second complete file from the first backup storage medium; and
    extracting the second complete file, without dependence on re-reading the backup storage media;
    reading a third complete file from the second backup storage medium; wherein the reading comprises:
    reading a third partial file from the first backup storage medium, reading the first partial file from the first backup storage medium, and reading the second partial file from the second backup storage medium, irrespective of the sequence in which the first and second backup storage media were originally written relative to one another; wherein the third partial file forms a portion of a second complete file; and
    extracting the portion of the second complete file from the third partial file, without dependence on re-reading the backup storage media and extracting the third complete file, without dependence on re-reading the backup storage media.

2. The method of claim 1, wherein the target storage is a computer-readable medium.

3. The method of claim 1, wherein the complete file is a first complete file, and wherein the reading comprises:
    reading a third partial file from a third backup storage medium, reading the first partial file from the first backup storage medium, reading a fourth partial file from the first backup storage medium, reading the second partial file from the second backup storage medium, and reading a fifth partial file from the second backup storage medium, irrespective of a sequence in which the backup storage media were originally written relative to one another; wherein the third partial file forms a first portion of a second complete file; wherein the fourth partial file forms a second portion of the second complete file; and
    wherein the fifth partial file forms a third portion of the second complete file.

4. The method of claim 3, and comprising:
    combining the third, fourth and fifth partial files to extract and form the second complete file, without dependence on re-reading the backup storage media.

5. A system, comprising:
    first and second backup storage media wherein the first and second storage media have respective media types that differ from one another; and
    an information handling system for:
    reading first and second partial files from the first and second backup storage media, respectively, irrespective of a sequence in which the first and second backup storage media were originally written relative to one another and without replicating a native environment in which the first and second backup storage media were written; wherein the first partial file forms a first portion of a complete file; and wherein the second partial file forms a second portion of the complete file; and
    combining the first and second partial files to extract and form the complete file, without dependence on re-reading the first and second backup storage media and wherein the complete file is a first complete file wherein the information handling system reads a second complete file from the first backup storage medium and extracts the second complete file without dependence on re-reading the backup storage media and reads a third complete file from the second backup storage medium extracts the third complete file, without dependence on re-reading the backup storage media; and
    writing the complete file to a computer-readable medium for storage; and
    performing an operation in response to the complete file that is stored by the computer readable medium.

6. The system of claim 5, wherein the information handling system is for:
    reading the first and second partial files from the first and backup second storage media, respectively, irrespective of the sequence in which the first and backup second storage media were originally written relative to one another, and without replicating a native environment with which the first and second backup storage media were originally written.

7. The system of claim 5, wherein the complete file is a first complete file, and wherein the information handling system is for:
   reading a third partial file from a third backup storage medium, reading the first partial file from the first backup storage medium, reading a fourth partial file from the first backup storage medium, reading the second partial file from the second backup storage medium, and reading a fifth partial file from the second backup storage medium, irrespective of a sequence in which the backup storage media were originally written relative to one another; wherein the third partial file forms a first portion of a second complete file; wherein the fourth partial file forms a second portion of the second complete file; and wherein the fifth partial file forms a third portion of the second complete file; and
   combining the third, fourth and fifth partial files to extract and form the second complete file, without dependence on re-reading the backup storage media.

8. The system of claim 5, wherein the complete file is a first complete file, and wherein the information handling system is for:
   reading a third partial file from the first backup storage medium, reading the first partial file from the first backup storage medium, and reading the second partial file from the second backup storage medium, irrespective of the sequence in which the first and second backup storage media were originally written relative to one another; wherein the third partial file forms a portion of a second complete file; and
   extracting the portion of the second complete file from the third partial file, without dependence on re-reading the backup storage media.

9. A non-transitory computer-readable medium storing computer executable instructions that when executed by a computer cause the computer to perform a method, the method comprising:
   reading first and second partial files from first and second backup storage media, respectively, irrespective of a sequence in which the first and second backup storage media were originally written relative to one another; wherein the first and second media types differ from each other and wherein the first partial file forms a first portion of a complete file; and wherein the second partial file forms a second portion of the complete file;
   combining the first and second partial files to extract and form the complete file, without dependence on re-reading the first and second backup storage media; wherein the complete file is a first complete file and wherein the information handling system reads a second complete file from the first backup storage medium and extracts the second complete file, without dependence on re-reading the backup storage media, and reads the second complete file from the first backup storage medium and extracts the third complete file, without dependence on re-reading the backup storage media;
   writing the complete file to a device for storage; and
   performing an operation in response to the complete file that is stored by the device.

10. The non-transitory computer-readable storage medium of claim 9, wherein the method further comprises:
    reading the first and second partial files from the first and second backup storage media, respectively, irrespective of the sequence in which the first and second backup storage media were originally written relative to one another, and without replicating a native environment with which the first and second backup storage media were originally written.

11. The non-transitory computer-readable storage medium of claim 9, wherein the complete file is a first complete file, and wherein the method further comprises:
    reading a third partial file from a third backup storage medium, reading the first partial file from the first backup storage medium, reading a fourth partial file from the first backup storage medium, reading the second partial file from the second backup storage medium, and reading a fifth partial file from the second backup storage medium, irrespective of a sequence in which the backup storage media were originally written relative to one another; wherein the third partial file forms a first portion of a second complete file; wherein the fourth partial file forms a second portion of the second complete file; and wherein the fifth partial file forms a third portion of the second complete file; and
    combining the third, fourth and fifth partial files to extract and form the second complete file, without dependence on re-reading the backup storage media.

12. The non-transitory computer-readable storage medium of claim 9, wherein the complete file is a first complete file, and wherein the method further comprises:
    reading a third partial file from the first backup storage medium, reading the first partial file from the first backup storage medium, and reading the second partial file from the second backup storage medium, irrespective of the sequence in which the first and second backup storage media were originally written relative to one another; wherein the third partial file forms a portion of a second complete file; and
    extracting the portion of the second complete file from the third partial file, without dependence on re-reading the backup storage media.

* * * * *